July 21, 1931.  I. SERRURIER  1,815,486
FILM VIEWING MACHINE
Filed Oct. 29, 1924   2 Sheets-Sheet 1
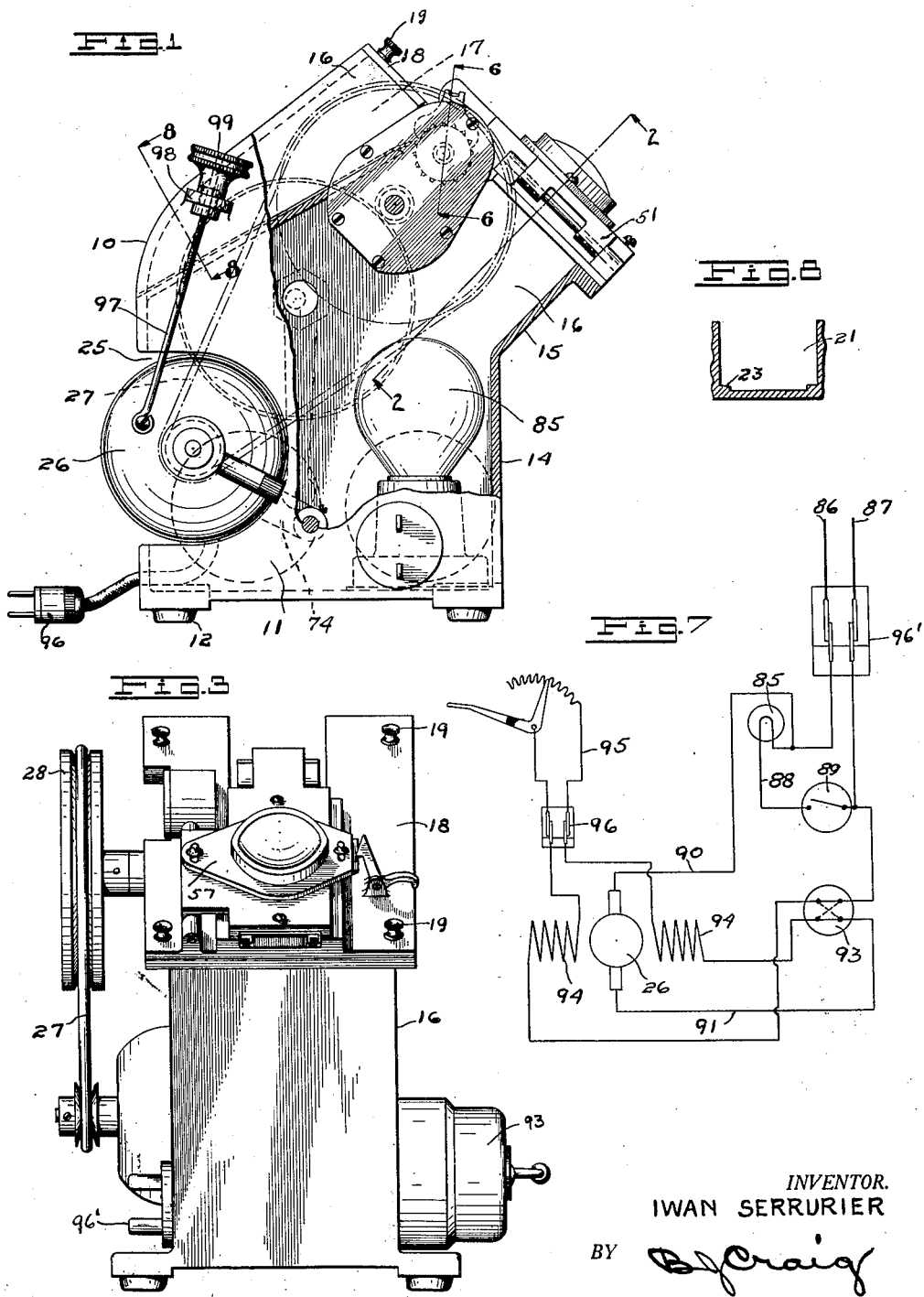
INVENTOR.
IWAN SERRURIER
BY B. J. Craig
ATTORNEY.

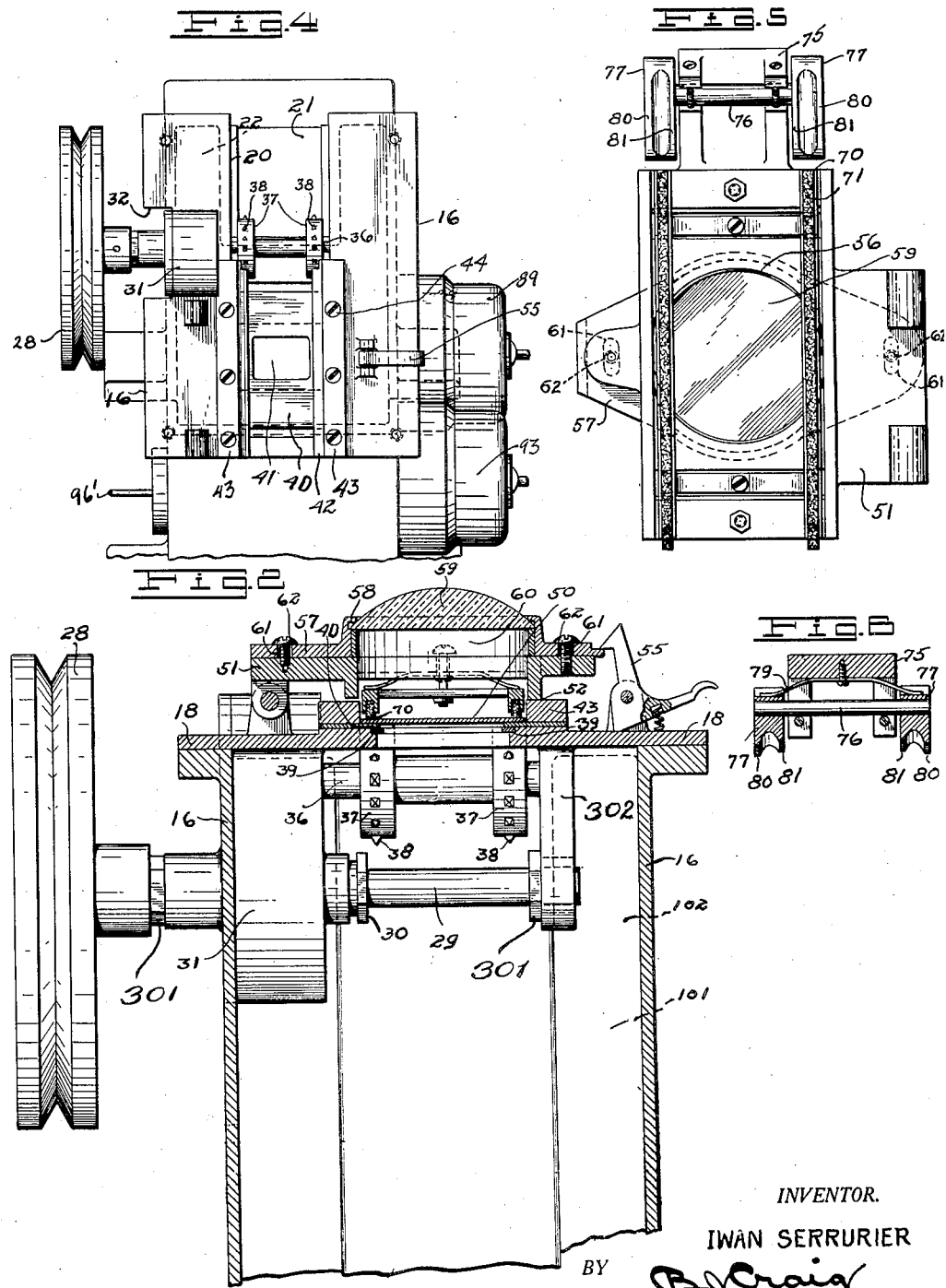

Patented July 21, 1931

1,815,486

UNITED STATES PATENT OFFICE

IWAN SERRURIER, OF ALTADENA, CALIFORNIA

FILM VIEWING MACHINE

Application filed October 29, 1924. Serial No. 746,511.

This invention relates to film viewing machines.

The general object of the invention is to provide a machine which will facilitate the examination and cutting of motion picture films.

One of the specific objects of the invention is to provide a novel power operated film viewing machine.

Another object of the invention is to provide a film viewing machine including means for moving the film past a viewing aperture together with means for shifting the viewing aperture so that the frames on the film will align with this aperture.

A further object of the invention is to provide an improved film guide having spaced rails on each side thereof and wherein the outermost rails are higher than the inner rails so that there is less liability of scratching the film.

An additional object of the invention is to provide a film viewing machine including an illuminating electric lamp and an operating motor and wherein a single power connection serves to illuminate the lamp and operate the motor.

A further object of the invention is to provide an improved supporting frame and casing for the operating parts of a film viewing machine.

Other objects of the invention will be apparent from the following description taken in connection with the accompanying drawings wherein Fig. 1 is a side elevation partly in section showing my improved machine; Fig. 2 is a section on line 2—2, Fig. 1; Fig. 3 is a front plan view of the machine; Fig. 4 is a top plan view of the machine; Fig. 5 is a bottom view of the closure member; Fig. 6 is a fragmentary section taken on line 6—6, Fig. 1; Fig. 7 is a wiring diagram and Fig. 8 is a section on line 8—8, Fig. 1.

Referring to the drawings by reference characters, I have shown a film viewing machine at 10. This machine comprises a body portion 11 which may have cushioned pads 12 thereon. The body portion comprises a front wall 14 which is inclined at its upper end as at 15. The rear wall corresponds generally in shape to the front wall while the side walls 16 are preferably parallel to each other.

The walls terminate in an opening 17 upon which is arranged a cover plate 18. The planes of the opening 17 and cover plate are aslant forwardly and downwardly relative to the horizontal. The cover plate is preferably held in place by thumb screws 19. Spaced from the side walls 16 I show parallel interior walls 20. These walls 20 provide a channel 21 through which the film may pass. The lower portion of the channel has film-supporting faces formed by side rails 23 thereon upon which the film may be advanced. The walls 16 and 20, being spaced, provide recesses 22 as shown. These recesses may accommodate the gears of a hand operated machine but if desired may be entirely eliminated.

The machine may be provided with any suitable drive, manual or otherwise. The rear of the body 11 is shown as provided with a recess 25 in which I mount an electric motor 26. This motor 26, which is preferably of the reversible type, is shown as connected by means of a belt 27 with a drive wheel 28 mounted on a shaft 29 which is arranged within the body 11. The shaft 29 is preferably mounted on eccentric bushings 301 to facilitate correct alignment. One of the bushings 301 is supported by a bracket 302 secured to the cover plate. The shaft projects through a stuffing box 30 on the case 31. The shaft 29 is arranged to drive an intermittent motion device which may be arranged in a case 31. This case 31 is adapted to be inserted in a recess 32 in the body 11 and is attached to the cover plate 18. This intermittent motion device forms no part of my invention. Devices of this nature are in wide use and it is thought that further description is unnecessary.

The intermittent motion device drives a shaft 36 on which sprockets 37 are mounted. The shaft 36 is rotatably mounted at one end in the case 31, and at its other end in the bracket 302. The sprockets 37 are provided with teeth 38 which are adapted to engage the apertures arranged along the opposed edges of motion picture film.

The cover 18 is provided with rabbets 39 in which I fit a movable slide 40. This slide is apertured as at 41 for a purpose to be presently described. The slide 40 is held in place by strips 42 which provide film-supporting faces and which are secured beneath fastening rails 43. These rails 43 are preferably held in position by screws 44. The film is shown in Fig. 2 at 50. This film is arranged to engage the strips 42, as shown and is guided laterally by the rails 43.

Of importance is the fact that the film-supporting faces of the rails 43 lie at approximately a right angle to the film-supporting faces of the strips 42, and that the said faces are tangential to the sprockets 37. By this construction the film is engaged by approximately one-fourth of the sprocket teeth, thus insuring against tearing of the film or undue wear of those edges of the film perforations that are engaged by said teeth.

Arranged upon the cover 18, I show a hinged closure 51. This hinged closure has a portion 52 thereon which engages one of the rails 43 to hold the closure in correct position. A locking member 55 releasably holds the closure.

The closure 51 is provided with a central opening 56 and with a slidable plate 57 which is mounted over the opening. The plate 57 is provided with a mounting 58 for a lens 59. The lens 59 aligns with an aperture 60 in the plate 57. The closure 57 is provided with slots 61 at each side thereof through which fastening members such as screws 62 extend. The screws 62 allow the plate 57 to be adjusted longitudinally of the film. The rails 43, hinged closure 51, and plate 57 together constitute a gate of which the rails 43 are the lower stationary member and the closure 51 with its plate 57 are the hinged unit of said gate.

From the foregoing description, it will be apparent that the plate 57 with the lens 59, as well as the slide 40 can be adjusted so that the aperture 41 will align with the lens 59 and both can be aligned with the frames in the films. It will be understood, however, that if desired, the device for providing this adjustability may be omitted.

The lower portion of the closure 51 is provided with a pair of spring pressed opposed rails 70 each of which is provided with a felt member 71 for engaging the film 50. Adjacent the sprockets 37, I provide a member 75 on the closure 51 (best shown in Fig. 6), for holding the film in engagement with the sprocket teeth. This member comprises a supporting bar 76 on which shoes 77 are mounted. These shoes 77 are held loosely on the supporting member 75 by means of a spring 79. The shoes 77 are each provided with a pair of engaging portions or rails 80 and 81. Each rail 80, it will be noted, is higher than the adjacent rail 81. In using the device in the normal operation, the rails 80 will engage the outer edge of the film. If, however, the outer edge of the film is torn or mutilated, the inner rail will engage the film.

Within the body of the machine and adjacent the aperture 41 I mount a lamp 85. A pair of power leads 86 and 87 are provided as shown in Fig. 7. These leads are connected across the lamp by a lead 88 which includes a switch 89. The lead 86 is also connected by means of a lead 90 with one pole of the motor 26 while the other pole of the motor is connected by a lead 91 with a terminal of the four-way switch 93. The power lead 87 is connected to another terminal of the four-way switch. The fields 94 of the motor are connected to the other two terminals of the four-way switch and in this connection, I place a rheostat 95. The arrangement is such that by operating the four way switch 93 the direction of the fields can be reversed so that the motor can be run forward or backward. The rheostat 95 may be a separate device and may be connected by means of a plug 96 to the motor circuit. Thus the speed of the motor may be controlled by the rheostat and the lamp may be controlled by the switch 89. The leads 86 and 87 may be connected if desired to a suitable outlet box by a cord and attachment plug 96'.

With the described arrangement it will be apparent that but one electric connection is needed for operating my device and that with this one connection made the motor can be operated forward or backward and the speed controlled, or it can be stopped entirely, during all of which operations the lamp 85 may remain illuminated.

In using machines of this nature, it is frequently desirable to go over a piece of film several times and with my reversible motor and my speed control means this action can be very readily done.

In order to change the tension of the belt 27 the motor is mounted with lugs 74 on a bolt. One end of a belt tightening member 97 is arranged on the motor 26 while the other end passes through a bracket 98 on the body of the machine. This end of the member 97 is threaded to receive an adjusting member 99, by means of which the belt may be tightened if desired. This member 99, as shown, comprises two interfitting collars, one of which has a gripping portion thereon.

Having thus described my invention, I claim:

1. In a film viewing machine, a casing having a lamp therein and having a motor thereon, an inspection opening in said casing adapted to be illuminated by said lamp, means operable by said motor to give a step by step motion to a film, a pair of leads, a circuit from one of said leads across said lamp to the other lead, a second circuit from one of said leads to the motor and back to the other lead, said second mentioned circuit including means for controlling said motor independent of the lamp.

2. In a film viewing machine, a casing including a body portion having a motor mounted thereon, a cover for said body, said cover having a shaft journaled thereto, means whereby said motor drives said shaft, a sprocket mounted on said cover, means to give said sprocket a step by step motion, a guideway for film at each side of the sprocket, said sprocket being arranged above both of said guideways, said cover having a viewing aperture therein and means for causing a film to engage said sprocket and means to illuminate said aperture.

3. In a film viewing machine, a hollow casing having a motor mounted therein, a cover for said casing, said cover having a depending rib thereon, a shaft journaled in said rib, means whereby said motor drives said shaft, a sprocket mounted on said cover, means to give said sprocket a step by step motion, means on said cover to cause a film to engage said sprocket, said cover having a viewing aperture therein, a closure on said cover, said closure having a lens thereon and means to illuminate said aperture.

4. In a film viewing machine, a casing having closed sides and a bottom and having a lamp therein, a cover for said casing, said cover having a film viewing aperture therein, means on the outside of said cover to direct film to said aperture, means to feed film past said aperture, said means comprising sprockets mounted below and projecting above said cover, means to drive said sprockets, said means including a motor, said motor being mounted in said casing.

5. A film viewing machine including a hollow body part, a cover removably mounted on said body, a slide on said cover, a closure on said cover, a slidable plate on said closure, a lens on said plate and means to hold said slidable plate in engagement with said closure.

6. A film-viewing machine comprising a body having walls terminating in an opening, a cover plate detachably secured to the body over the opening and provided with an opening registering with the body opening, the plane of the cover plate being aslant forwardly and downwardly relative to the body, an intermittent motion device attached to the cover, a motor, driving connections between the motor and the intermittent motion device, a shaft rotatably supported by the cover plate and operably connected with the intermittent motion device, sprockets mounted on said shaft, an apertured gate mounted on the cover plate over the cover opening, and a lens mounted on the gate.

In testimony whereof, I hereunto affix my signature.

IWAN SERRURIER.